United States Patent [19]
Neely et al.

[11] Patent Number: 6,060,584
[45] Date of Patent: May 9, 2000

[54] PROCESS FOR THE DEGRADATION OF POLYOLEFINS

[75] Inventors: Brenda Linette Neely; James Houston Scott, both of Longview, Tex.

[73] Assignee: Eastman Chemical Company, Kingsport, Tenn.

[21] Appl. No.: 09/078,229

[22] Filed: May 13, 1998

[51] Int. Cl.$^7$ .............................. C08F 8/50; C08F 10/06
[52] U.S. Cl. ................... 528/501; 528/481; 528/502 R; 528/502 C; 528/502 F; 528/503; 525/938
[58] Field of Search ..................................... 528/481, 501, 528/502 R, 502 F, 502 C, 503; 525/938

[56] References Cited

U.S. PATENT DOCUMENTS

| | | |
|---|---|---|
| 3,087,922 | 4/1963 | Whittington . |
| 3,121,070 | 2/1964 | Coover, Jr. et al. . |
| 3,144,436 | 8/1964 | Greene et al. . |
| 3,248,469 | 4/1966 | Kosinsky et al. . |
| 3,332,926 | 7/1967 | Baron, Jr. et al. . |
| 3,345,352 | 10/1967 | Baron, Jr. et al. . |
| 3,519,609 | 7/1970 | McConnell et al. . |
| 3,551,943 | 1/1971 | Staton et al. . |
| 3,562,788 | 2/1971 | Weemes et al. . |
| 3,563,972 | 2/1971 | Kowalski . |
| 3,598,885 | 8/1971 | Peters . |
| 3,608,001 | 9/1971 | Kowalski et al. . |
| 3,634,381 | 1/1972 | Lehnerer et al. ..................... 528/502 F |
| 3,723,402 | 3/1973 | Owen et al. . |
| 3,842,153 | 10/1974 | Owen et al. . |
| 3,862,265 | 1/1975 | Steinkamp et al. . |
| 3,898,209 | 8/1975 | Watson et al. . |
| 3,940,379 | 2/1976 | Castagna . |
| 4,001,172 | 1/1977 | Steinkamp et al. . |
| 4,707,524 | 11/1987 | Ehrig et al. . |
| 4,749,505 | 6/1988 | Chung et al. . |
| 5,262,489 | 11/1993 | White et al. ......................... 525/938 X |
| 5,292,862 | 3/1994 | Miura et al. . |
| 5,530,073 | 6/1996 | Schoenberg . |
| 5,587,434 | 12/1996 | McCullough, Jr. et al. . |
| 5,594,074 | 1/1997 | Hwo et al. . |
| 5,631,346 | 5/1997 | Deckers et al. . |

FOREIGN PATENT DOCUMENTS

| | | |
|---|---|---|
| 0 180 444 | 5/1986 | European Pat. Off. ............... 525/938 |
| 1042178 | 9/1966 | United Kingdom . |

*Primary Examiner*—Fred Teskin
*Attorney, Agent, or Firm*—Jonathan D. Wood; Harry J. Gwinnell

[57] ABSTRACT

A novel process for the production of degraded polyolefin is described. The process involves introducing polyolefin into one end of a vented multi-screw extruder, in the substantial absence of free radical initiator and oxidizing agent, and removing degraded polyolefin from the opposite end of the extruder.

18 Claims, No Drawings

PROCESS FOR THE DEGRADATION OF POLYOLEFINS

FIELD OF THE INVENTION

This invention relates to a continuous process for the degradation of polyolefins, particularly homopolymers and copolymers of propylene. More particularly, this invention relates to a process for degrading polyolefins in the substantial absence of any free radical initiator or any oxidizing agent, in a vented multi-screw extruder, preferably a vented twin-screw extruder.

BACKGROUND OF THE INVENTION

U.S. Pat. No. 5,631,346 describes a process for degrading polyolefins in a twin-screw extruder operated at a pressure of 1–100 bar, wherein the pressure is changed with a range of variation of 0.5–30 bar. A dissertation entitled "Studies of Thermal/Peroxide Induced Degradation and Maleation of Polypropylene in a Modular Intermeshing Twin Screw Extruder" is indicated to have been presented by Byoungjoo Kim at the University of Akron in May, 1996 wherein the effects of screw configurations, screw speeds and peroxide concentrations were examined for both co-rotating and counter-rotating twin-screw extruders at temperatures of 230° C. up to a maximum of 290° C.

British Patent No. 1,042,178 describes narrowing the molecular weight distribution of polyolefins by degradation using high shear gradients at temperatures between the melting point and the temperature at which purely thermal degradation of the polyolefin occurs.

U.S. Pat. No. 3,087,922 describes a process for the pyrolysis of a high molecular weight polyolefin to produce a lower molecular weight polymer by passing the polymer through a pyrolysis zone in the form of a fluid stream having annular cross section, and transferring heat of pyrolysis to the polymer through both exterior and interior boundaries of the annular stream. U.S. Pat. No. 3,248,469 describes a method of visbreaking a polymer of an olefin by feeding the polymer to a shearing zone at a controlled rate, passing sheared polymer through an extrusion zone, and maintaining a positive back pressure on the polymer. U.S. Pat. No. 5,292,862 describes a continuous process for the production of low molecular weight polyolefin by feeding the polymer to an extruder for melting, metering the molten polymer at a constant rate to a tubular degradation reactor, and thermally degrading the polymer in the reactor in the presence of a higher fatty acid, a hydrochloric acid acceptor or a mixture thereof.

The following patents describe polyolefin degradation processes that utilize a catalyst. U.S. Pat. No. 3,332,926 describes a process for degrading polyolefins by mixing a crystalline polyolefin with a metal salt of a carboxylic acid and heating the resultant mixture in an atmosphere substantially free of oxygen to a temperature of 275–450° C. U.S. Pat. No. 3,345,352 describes a process for degrading polyolefins by heating the polymer to a temperature of 275–450° C. in the presence of an oxide or carbonate catalyst and in the absence of oxygen for at least five minutes. U.S. Pat. No. 3,519,609 describes a process for degrading polyolefins at temperatures of 200–400° C. in the absence of oxygen and in the presence of an organic anhydride catalyst. U.S. Pat. No. 3,562,788 describes a process for degrading polyolefins in the presence of metal coordination polymerization catalyst residue. U.S. Pat. Nos. 3,723,402 and 3,842,153 describe processes for degrading isotactic polypropylene in the presence of an organosilicon compound.

The following patents describe processes for degrading polyolefins wherein an oxygen-containing gas is utilized. U.S. Pat. Nos. 3,551,943; 3,563,972; and 3,608,001 describe degradation processes utilizing an extruder-reactor to heat mixtures of polypropylene with an oxygen-containing gas, wherein feedback means are provided to change the temperature in the extruder thereby controlling the molecular weight of the exiting polymer. U.S. Pat. No. 3,898,209 describes a process for controlled scission of polypropylene by injecting, under pressure, controlled amounts of oxygen into the melt-phase of the polypropylene at specified temperatures. U.S. Pat. No. 3,940,379 describes a process for controlled oxidative degradation of propylene polymers by injecting oxygen or an oxygen-containing gas and an organic or inorganic peroxide, melting and working the resulting mixture in a high shear zone, and recovering an essentially odor-free propylene polymer having a melt flow rate higher than that of the feed polymer.

The following patents describe processes for degrading polyolefins by mixing another polymer therewith. U.S. Pat. No. 3,121,070 describes the degradation of polypropylene at temperatures of 275–450° C. in the presence of a modifying polymer. U.S. Pat. No. 3,598,885 describes a process for preparing low molecular weight polymers by mixing relatively thermally stable polyolefins with relatively thermally unstable polymers and thermally cracking the mixture.

The following patents describe processes for degrading polyolefins wherein a free-radical initiator is utilized. U.S. Pat. No. 4,707,524 describes the degradation of polypropylene by mixing a peroxide therewith and melting the resulting mixture under thermal mechanical action. U.S. Pat. No. 4,749,505 describes a process for degrading polyolefins in the presence of a free-radical initiator, under an inert blanket of nitrogen. U.S. Pat. No. 5,594,074 describes a process wherein unreacted free-radical generators are used to produce polymer pellets that are degraded by thermal treatment. U.S. Pat. Nos. 3,862,265 and 4,001,172 describe processes for degrading polyolefins in extruders wherein free-radical initiators are injected into the reaction zone. U.S. Pat. No. 5,530,073 describes a process for the controlled degradation of polypropylene having increased peroxide efficiency. U.S. Pat. No. 5,587,434 describes a process for degrading polypropylene wherein polypropylene is mixed with a free-radical generator in increments, in an extruder. This is also described in U.S. Pat. No. 3,144,436.

SUMMARY OF THE INVENTION

The process for degrading polyolefins, particularly polypropylene, according to the present invention comprises introducing polyolefin into one end of a multi-screw extruder, degrading the polyolefin in the substantial absence of free-radical initiator or oxidizing agent at a sufficient temperature and for a sufficient time to degrade the polyolefin, venting the extruder and continuously removing degraded polyolefin from the opposite end of the extruder. Preferably, the process is carried out in a substantially inert environment.

DETAILED DESCRIPTION OF THE INVENTION

The applicants have unexpectedly discovered a novel process for degrading polyolefins, particularly polypropylene. The process according to the present invention for producing degraded polyolefins comprises:

a. introducing polyolefin, preferably polypropylene, into one end of a multi-screw extruder, preferably a twin-screw extruder, b. degrading the polyolefin in the substantial absence of free-radical initiator or oxidizing agent at a sufficient temperature, preferably from about 250° C. to about 550° C., and for a sufficient time to degrade the polyolefin, c. venting the extruder, and d. removing the degraded polyolefin from the opposite end of the extruder.

The process according to the present invention degrades any polyolefin prepared from any olefin starting material, and includes homopolymers, copolymers, terpolymers and the like. Suitable homopolymers include polyethylene, polypropylene, poly-1-butene, poly-1-pentene, poly-1-hexene, poly-1-dodecene, poly-4-methyl-1-pentene, poly-3-methyl-1-butene, and the like. Suitable for use herein are also copolymers such as those of ethylene and propylene, ethylene and 1-butene, propylene and 1-butene, propylene and 4-methyl-1-pentene, 1-butene and 4-methyl-1-pentene, propylene and 1-hexene, propylene and 1-dodecene, 4-methyl-1-pentene and 1-hexene, 1-butene and 1-pentene, 1-butene and 1-octene, 1-butene and 4,4-dimethyl-1-pentene, and the like. Preferred for use herein are polyolefins prepared from olefins having at least 3 carbons and including homopolymers, copolymers, terpolymers thereof, and the like. Still more preferred are copolymers, terpolymers and the like of at least 3 carbon containing olefins with a comonomer where the 3 carbon containing component comprises the majority component and, more preferably, at least 70% by weight. Most preferred for use herein are polypropylene homopolymers, and copolymers, terpolymers, and the like, of propylene with other copolymerizable monomers wherein at least 70% by weight of the copolymers, terpolymers and the like is comprised of propylene.

The process according to the present invention utilizes a multi-screw extruder, preferably a twin-screw extruder. The twin-screw extruder has two shafts that are preferably intermeshing, and that may be either co-rotating or counter-rotating. As used herein, the term, intermeshing, describes shafts that fit together properly such that the shafts rotate in coordination with each other in close proximity without mechanical interference. Further, as used herein, the term, co-rotating, describes shafts rotating in the same direction; the term, counter-rotating, describes shafts rotating in opposite directions.

According to the process of the invention, the multi-screw extruder is operated at any temperature at which the polyolefin will be degraded, preferably at a temperature of from about 250° C. to about 550° C., more preferably from about 280° C. to about 500° C., with a temperature of from about 350° C. to about 450° C. being most preferred. Preferably, the multi-screw extruder is operated at a screw rate of from about 100 to about 1200 revolutions per minute (RPM). Preferably, the multi-screw extruder, according to the invention, is operated such that the feed rate of the polymer is at least about 3 kg/hour per liter (L) of free volume in the extruder, preferably about 3 to about 100 kg/hour per liter of free volume in the extruder, more preferably about 3 to about 80 kg/hour per liter of free volume in the extruder, with a feed rate of from about 5 to about 50 kg/hour per liter of free volume in the extruder being most preferred. The term, free volume in the extruder, as used herein, describes the internal volume of the barrel of the extruder less the estimated volume occupied by the shaft and screw elements.

The residence time of the polyolefin in the multi-screw extruder depends, among others, upon the feed rate of the polyolefins, the screw rate of the extruder, and the size (volume) of the extruder, and is such that there is obtained polymer degraded to the desired extent.

The process according to the present invention is carried out in the substantial absence of free radical initiator or oxidizing agent. Free radical initiators are compounds that have been widely utilized in the degradation of polymers. Free radical initiator is defined herein as a substance capable of homolytically cleaving a chemical bond generating an unstable species with an unpaired electron. Many such free radical initiators are known, with peroxides being perhaps the most widely known. Oxidizing agent is defined herein as a substance that increases the oxidation number of elements. Preferably, the process according to the present invention is carried out in a substantially inert environment, by which is intended an environment substantially free from oxygen or other reactive species. The substantially inert environment can be accomplished in any suitable manner, for example by providing an atmosphere or blanket of an inert gas such as nitrogen, argon and the like in the extruder.

The process according to the present invention is carried out in a multi-screw extruder provided with at least one vent for the discharge of volatile materials from the extruder. At least one vent is located in the extruder at a position after the polymer has been degraded to the desired extent and prior to removal of the degraded polymer product from the extruder. It is preferred that the vent be provided with vacuum whereby the vacuum venting of the extruder is conducted at a pressure less than atmospheric pressure.

The process according to the present invention degrades polyolefins without requiring the addition of other chemical reagents. In particular, no free-radical initiator or oxidizing agent is introduced into the process according to the present invention. As a result, the process of the present invention can be used to produce degraded polyolefins, particularly polypropylene, that do not have undesirable oxygenated compounds, as is the result obtained when using a free-radical initiator or an oxidizing agent. The present process has been found to be easily controllable to allow the production of polymers degraded to a desired degree.

The degraded polymeric products resulting from the process according to the present invention are useful in many applications, such as, in the preparation of color concentrates, toners, adhesives, inks, and wax blending.

Also, the degraded products resulting from the process according to the present invention may be further chemically modified, as for example, chlorinated or reacted with a maleating agent such as maleic anhydride to yield products having utility in preparing floor polishes, paints and color concentrates and as coupling agents, compatibilizers and sizing agents.

The following examples are intended to illustrate the present invention but should not be interpreted as a limitation upon the reasonable scope thereof.

EXAMPLES

The melt flow rate (MFR) of polypropylene is determined according to ASTM D-1238, Procedure B. Units are expressed as grams per 10 minutes (g/10 min).

Viscosity is determined in accordance with ASTM D-3236 utilizing a Brookfield Model RVTD Digital Viscometer with a SC 4-27 spindle and a Brookfield Model 74R Temperature Controller set to 190° C., with the following exceptions:

a. viscosity was recorded 20 minutes after beginning spindle rotation in the sample;

b. only single measurements were taken for each sample; and c. the rotational speeds were noted and used in the test procedure, but not recorded.

The units are expressed as centipoise (cP) or mPa.s.

Example 1

In this example, degradation effects resulting from use and non use of venting of the extruder, are shown. The apparatus utilized herein for carrying out the process was a Berstorff ZE 25 twin-screw extruder having an L/D (length/diameter) ratio of 63. The Berstorff twin screw extruders are produced and sold by Berstorff Corporation, Charlotte, N.C. For all runs in the series of Example 1, the polyolefin feed was polypropylene having a melt flow rate (MFR) of 12 g/10 min; the feed rate of the polypropylene into the extruder was 20.0 pounds per hour (9.07 kg/hour) per liter of extruder free volume; and the extruder screw speed was 300 RPM (revolutions per minute). When utilized, the vacuum venting of the extruder occurred after the starting polypropylene (MFR of 12 g/10 min) had been degraded to the extent desired. If not utilized, the vent port of the extruder was plugged. The extruder, in all runs, was operated until the desired degree of degradation in the polypropylene was achieved. No free radical initiator was added in the runs in this example. The results are reported in Table I.

purged with nitrogen gas, the polyolefin feed was degraded for a sufficient period of time to provide the desired degree of degradation, and the extruder was vacuum vented. In the runs of this Example 2, no free radical initiator or oxidizing agent was added. The polyolefin feed, which was polypropylene having a melt flow rate (MFR) of 12 g/10 min, was introduced into the extruder at a feed rate ranging from 22.3 to 163.8 pounds/hour (10.1–74.3 kg/hour) per liter of free volume in the extruder. In the following Table II, the final degraded polypropylene products of run numbers 12, 13, 16 and 17 had viscosity values that could not be measured by means of a Brookfield viscometer and, accordingly, melt flow rates (MFR) were measured for these products. The results of this series of runs are reported in the following Table II.

TABLE II

| Run Number | Polypropylene Feed Rate, pounds/hour per liter of free volume in the extruder | Polypropylene Feed Rate, kg/hour per liter of free volume in the extruder | Extruder Set-Point Temperature, °C. | Temperature of Molten Polymer Measured at Extruder Die, °C. | Degraded Product Viscosity, centipoise at 190° C. | Degraded Product MFR, grams/10 minutes at 230° C. |
|---|---|---|---|---|---|---|
| 6 | 22.3 | 10.1 | 350 | 280 | 3200 | |
| 7 | 32.0 | 14.5 | 350 | 285 | 4900 | |
| 8 | 44.3 | 20.1 | 350 | 295 | 32,000 | |
| 9 | 56.7 | 25.7 | 350 | 310 | 74,000 | |
| 10 | 69.3 | 31.4 | 350 | 305 | 138,000 | |
| 11 | 81.9 | 37.1 | 350 | 320 | 157,500 | 154 |
| 12 | 139.1 | 63.1 | 350 | 320 | | 36.9 |
| 13 | 163.8 | 74.3 | 350 | 310 | | 29.5 |
| 14 | 22.3 | 10.1 | 290 | 260 | 232,000 | |
| 15 | 32.0 | 14.5 | 290 | 260 | 375,000 | |
| 16 | 56.7 | 25.7 | 290 | 300 | | 37.3 |
| 17 | 81.9 | 37.1 | 290 | 305 | | 25.1 |

TABLE I

| Run Number | Extruder Zone Set-Point Temperature Profile, °C. | Vacuum Venting | Melt Flow Rate (MFR) of Degraded Polypropylene, grams/10 minutes at 230° C. |
|---|---|---|---|
| 1 | 200° C.–350° C. | No | 93 |
| 2* | 200° C.–350° C. | Yes | about 2400 |
| 3 | 200° C.–350° C. | No | 53 |
| 4 | 200° C.–280° C. | Yes | 142 |
| 5 | 200° C.–280° C. | No | 44 |

*Viscosity of Run Number 2 was 7600 cP at 190° C.

From the above data in Table I, the following are observed. A comparison of Runs 2 with 3, and Runs 4 with 5 illustrate the greater degree of degradation in the polypropylene when the extruder is vented as compared to non venting of the extruder. This result is completely unexpected in view of prior knowledge.

Example 2

In this example, consisting of runs numbered 6–17 inclusive, effects on degradation, of varying the feed rate of polyolefin into the extruder are illustrated, at operating temperature of 350° C. and 290° C. Used herein was a Berstorff ZE 25 twin screw extruder having L/D ratio of 43. For all 12 runs in this series, the screw speed of the extruder was 350 RPM (revolutions per minute), the extruder was From the above data in Table II, it is observed that, for a given extruder set-point temperature, as the feed rate of the polyolefin was increased, the polymer melt temperature was generally increased, the polymer viscosity was increased, and the polymer melt flow rate (MFR) was decreased.

Example 3

In this example, the effects of using a different size twin screw extruder are illustrated. More particularly, the extruder used herein was a Berstorff ZE 40A twin-screw extruder having an L/D ratio of 40.5. In this example, a statistically-designed experiment was performed, varying many operating conditions. For example, four (4) levels of polyolefin feed rate were evaluated, namely, 30.5, 61.0, 91.4 and 121.9 pounds/hour (corresponding to 13.8, 27.7, 41.5 and 55.3 kg/hour) per liter of free volume in the extruder; extruder screw speeds varying from 350 to 870 RPM were evaluated; extruder barrel set-point temperatures of 370° C. and 390° C. were evaluated; and vent vacuum levels ranging from 6 to 27 inches mercury were evaluated. The degraded polyolefin products had viscosity levels, measured at 190° C., ranging from about 3100 cP to about 39,800 cP. In addition, the data herein illustrated that, in general, the viscosity of the resulting degraded polymer products decreased as the extruder barrel set-point temperature was increased, as the extruder screw speed was increased, and/or as the polyolefin feed rate to the extruder was decreased. No free radical initiator or oxidizing agent was added in the runs of this example. For all runs, the extruder was purged with nitrogen gas. The results are reported hereinbelow in Table III.

TABLE III

| Run Number | Propylene Feed Melt Flow Rate (MFR), g/10 minutes @ 230° C. | Propylene Feed Rate, pounds/hr per liter of free volume in extruder | Propylene Feed Rate, kg/hr per liter of free volume in extruder | Extruder Screws Speed, RPM | Extruder Set-Point Temperature, ° C. | Vent Vacuum, Inches Mercury | Temperature of Molten Polymer Measured at Extruder Die, ° C. | Product Viscosity, centipoise @ 190° C. |
|---|---|---|---|---|---|---|---|---|
| 18 | 110 | 30.5 | 13.8 | 500 | 370 | 6 | 339 | 3,100 |
| 19 | 110 | 61.0 | 27.7 | 500 | 370 | 6 | 356 | 6,800 |
| 20 | 110 | 91.4 | 41.5 | 500 | 370 | 17 | 345 | 13,300 |
| 21 | 110 | 61.0 | 27.7 | 425 | 370 | 6 | 354 | 8,300 |
| 22 | 110 | 61.0 | 27.7 | 870 | 370 | 6 | 367 | 3,700 |
| 23 | 110 | 91.4 | 41.5 | 870 | 370 | 6 | 355 | 7,000 |
| 24 | 110 | 91.4 | 41.5 | 870 | 390 | 27 | 367 | 4,600 |
| 25 | 12 | 61.0 | 27.7 | 350 | 370 | 27 | 366 | 39,800 |
| 26 | 12 | 30.5 | 13.8 | 870 | 370 | 27 | 366 | 5,800 |
| 27 | 12 | 61.0 | 27.7 | 870 | 370 | 27 | 382 | 8,500 |
| 28 | 12 | 91.4 | 41.5 | 870 | 370 | 27 | 388 | 22,500 |
| 29 | 12 | 61.0 | 27.7 | 350 | 390 | 27 | 376 | 28,300 |
| 30 | 12 | 61.0 | 27.7 | 500 | 390 | 27 | 385 | 25,000 |
| 31 | 12 | 61.0 | 27.7 | 625 | 390 | 27 | 383 | 11,000 |
| 32 | 12 | 61.0 | 27.7 | 700 | 390 | 27 | 386 | 10,100 |
| 33 | 12 | 61.0 | 27.7 | 870 | 390 | 27 | 381 | 4,700 |
| 34 | 12 | 91.4 | 41.5 | 870 | 390 | 27 | 391 | 19,400 |
| 35 | 12 | 121.9 | 55.3 | 870 | 390 | 27 | 397 | 33,900 |

Example 4

In this example, it is shown that the process according to the present invention can be successfully carried out utilizing, as a feed to be degraded, a polyolefin that has been contacted with a peroxide free radical initiator prior to being introduced into the process according to the present invention. In carrying out the runs of the example, there was utilized a Berstorff ZE 40A twin-screw extruder having an L/D ratio of 40.5. The runs of this example were achieved by contacting a polypropylene with a peroxide in the first half of the extruder to cause a partial degradation of the polypropylene. Thereafter, the partially degraded polypropylene was used as the feed, in the second half of the extruder, in accordance with the process of the invention. More particularly, in this example, a statistically designed experiment was performed varying many operating conditions. For example, the weight ratio of the amount of peroxide to the amount of polypropylene ranged from 1/516 to 1/1397; polypropylene feed rates evaluated were 61.0 and 91.4 pounds/hour (equivalent to 27.7 and 41.5 kg/hour) per liter of free volume in the extruder; extruder barrel set-point temperatures evaluated were 370° C., 390° C. and 410° C.; extruder screw speeds used ranged from 350 RPM to 870 RPM. In all runs, however, the feed was polypropylene, having a melt flow rate of 12 g/10 min, and the peroxide was a 10% solution by weight of 2,5-dimethyl-2,5-bis (tert-butylperoxy) hexane diluted with ISOPAR M solvent (ISOPAR is a registered trademark for products produced and sold by EXXON Corporation). Further, the extruder was vented after the partial degradation with the peroxide occurred, and also was vented after the partially degraded polypropylene was degraded to the finally desired degree. Moreover, in the runs of this example, the polypropylene was contacted with the peroxide solution at an extruder set-point temperature of 215° C., for a sufficient period of time until the desired degree of partial degradation occurred, at which time the extruder was vented. The resulting partially degraded polypropylene was then utilized as the feed in the process of the invention. In all runs, the extruder was purged with nitrogen gas. From the data, it was noted that the viscosity levels of the polymer products degraded to the desired degree ranged from about 2900 to about 16,750 cP. Moreover, it was observed from the data that, in general, the polymer product viscosity decreased as the extruder set-point temperature was increased, as the extruder screw speed was increased, as the polypropylene feed rate was decreased, and/or as the ratio of peroxide to polypropylene was increased. The data are reported hereinbelow in Table IV.

TABLE IV

| Run Number | Polypropylene Feed Melt Flow Rate (MFR), g/10 minutes @ 230° C. | Polypropylene Feed Rate, pounds/hr per liter of free volume in extruder | Polypropylene Feed Rate, kg/hr per liter of free volume in extruder | Extruder Screw Speed, RPM | Weight Ratio of Peroxide to Polypropylene | Extruder Set-Point Temperature Where Polypropylene Interacts with Peroxide, ° C. |
|---|---|---|---|---|---|---|
| 36 | 12 | 61.0 | 27.7 | 500 | 1/782 | 215 |
| 37 | 12 | 91.4 | 41.5 | 500 | 1/774 | 215 |
| 38 | 12 | 61.0 | 27.7 | 350 | 1/782 | 215 |
| 39 | 12 | 61.0 | 27.7 | 500 | 1/516 | 215 |
| 40 | 12 | 61.0 | 27.7 | 500 | 1/782 | 215 |
| 41 | 12 | 61.0 | 27.7 | 500 | 1/1397 | 215 |
| 42 | 12 | 61.0 | 27.7 | 870 | 1/782 | 215 |
| 43 | 12 | 91.4 | 41.5 | 870 | 1/774 | 215 |

TABLE IV-continued

| Run Number | | | | | | |
|---|---|---|---|---|---|---|
| 44 | 12 | 61.0 | 27.7 | 500 | 1/782 | 215 |
| 45 | 12 | 91.4 | 41.5 | 500 | 1/774 | 215 |

| Run Number | Initial Vent Vacuum, Inches Mercury | Extruder Set-Point Temperature After Initial Venting, °C. | Final Vent Vacuum, Inches Mercury | Temperature of Molten Polymer Measured at Extruder Die, °C. | Product Viscosity centipoise @ 190° C. |
|---|---|---|---|---|---|
| 36 | 17 | 370 | 7 | 351 | 7,350 |
| 37 | 17 | 370 | 7 | 366 | 16,750 |
| 38 | 17 | 390 | 6 | 333 | 8,650 |
| 39 | 16 | 390 | 5 | 338 | 4,650 |
| 40 | 17 | 390 | 7 | 362 | 5,300 |
| 41 | 16 | 390 | 5 | 326 | 8,900 |
| 42 | 17 | 390 | 6 | 376 | 2,900 |
| 43 | 17 | 390 | 7 | 361 | 6,750 |
| 44 | 17 | 410 | 7 | 372 | 4,050 |
| 45 | 17 | 410 | 7 | 351 | 10,550 |

Example 5

In this example, a larger size extruder was utilized, namely a Berstorff ZE 90A twin screw extruder having an L/D ratio of 38. A series of runs was carried out varying many operating conditions. For example, extruder barrel set-point temperatures evaluated were 380° C., 390° C., 420° C. and 440° C.; extruder screw speeds ranging from 200 to 315 RPM were evaluated; and polyproplyene feed rates ranging from 10.7 to 42.3 pounds per hour (4.9–19.2 kg/hour) per liter of free volume in the extruder were evaluated. In all runs, the feed was polypropylene having a melt flow rate (MFR) of 12 g/10 min, and the extruder was purged with nitrogen gas. In all runs, after the polypropylene was degraded for a sufficient period of time to provide the desired degraded polypropylene product, the extruder was vented. No free radical initiator or oxidizing agent was added to the process. From the data in the runs, it was observed that the resulting degraded polyproplyene products had viscosity levels measured at 190° C., ranging from about 500 cP to about 5,300 cP. Further, from the data, it was observed that, in general, the viscosity of the degraded products decreased as the extruder set-point temperature was increased, as the extruder screw speed was increased, and/or as the polypropylene feed rate was decreased. The results of the runs are reported hereinbelow in Table V.

It should be clearly understood that the forms of the invention herein described are illustrative only and are not intended to limit the scope of the invention. The present invention includes all modifications falling within the scope of the following claims.

We claim:

1. A process for the degradation of polyolefin selected from the group consisting of polypropylene and a copolymer or terpolymer of propylene with at least one monomer copolymerizable therewith comprising:

(a) introducing the selected polyolefin into one end of a multi-screw extruder, (b) degrading the polyolefin, in the substantial absence of free radical initiator and oxidizing agent, at a sufficient temperature and for a sufficient time to degrade the polyolefin, (c) venting the multi-screw extruder, and (d) removing the degraded polyolefin from the opposite end of the multi-screw extruder.

2. The process according to claim 1 wherein the propylene is present in an amount of at least 70 percent by weight of the copolymer or terpolymer thereof.

3. The process according to claim 1 wherein the polyolefin is polypropylene.

TABLE V

| Run Number | Propylene Feed Melt Flow Rate (MFR), g/10 minutes @ 230° C. | Propylene Feed Rate, pounds/hr per liter of free volume in extruder | Propylene Feed Rate, kg/hr per liter of free volume in extruder | Extruder Screws Speed, RPM | Extruder Set-Point Temperature, °C. | Vent Vacuum, Inches Mercury | Temperature of Molten Polymer Measured at Extruder Die, °C. | Product Viscosity, centipoise @ 190° C. |
|---|---|---|---|---|---|---|---|---|
| 46 | 12 | 10.7 | 4.9 | 270 | 380 | 10 | — | 3,550 |
| 47 | 12 | 13.6 | 6.2 | 220 | 390 | 6 | 383 | 3,000 |
| 48 | 12 | 10.7 | 4.9 | 200 | 420 | 6 | 419 | 1,325 |
| 49 | 12 | 10.7 | 4.9 | 270 | 420 | 5 | 399 | 950 |
| 50 | 12 | 10.7 | 4.9 | 315 | 420 | 6 | 405 | 750 |
| 51 | 12 | 10.7 | 4.9 | 200 | 440 | 6 | 417 | 615 |
| 52 | 12 | 11.5 | 5.2 | 315 | 440 | 6 | 421 | 610 |
| 53 | 12 | 12.1 | 5.5 | 315 | 440 | 6 | 417 | 500 |
| 54 | 12 | 23.7 | 10.8 | 314 | 440 | 5 | 418 | 1,425 |
| 55 | 12 | 42.3 | 19.2 | 314 | 440 | 6 | 412 | 5,300 |

4. The process according to claim 1 wherein the multi-screw extruder is a twin-screw extruder.

5. The process according to claim 4 wherein the twin-screw extruder is an intermeshing twin-screw extruder.

6. The process according to claim 5 wherein the intermeshing twin screw extruder is a co-rotating intermeshing twin-screw extruder.

7. The process according to claim 1 wherein the temperature ranges from about 250° C. to about 550° C.

8. The process according to claim 7 wherein the temperature ranges from about 280° C. to about 500° C.

9. The process according to claim 8 wherein the temperature ranges from about 350° C. to about 450° C.

10. The process according to claim 4 wherein the twin-screw extruder is operated at a screw rate of from about 100 to about 1200 revolutions per minute (RPM).

11. The process according to claim 4 wherein the polyolefin is introduced into the twin-screw extruder at a feed rate of at least about 3 kg/hour per liter of free volume in the extruder.

12. The process according to claim 11 wherein the feed rate is from about 3 to about 100 kg/hour per liter of free volume in the extruder.

13. The process according to claim 12 wherein the feed rate is from about 3 to about 80 kg/hour per liter of free volume in the extruder.

14. The process according to claim 13 wherein the feed rate is from about 5 to about 50 kg/hour per liter of free volume in the extruder.

15. The process according to claim 1 wherein the polyolefin is degraded in a substantially inert environment.

16. The process according to claim 4 wherein the twin-screw extruder is vacuum vented.

17. The process according to claim 1 wherein the polyolefin introduced into the multi-screw extruder is a partially degraded polyolefin.

18. The process according to claim 17 wherein the polyolefin is polypropylene.

* * * * *